No. 772,041.

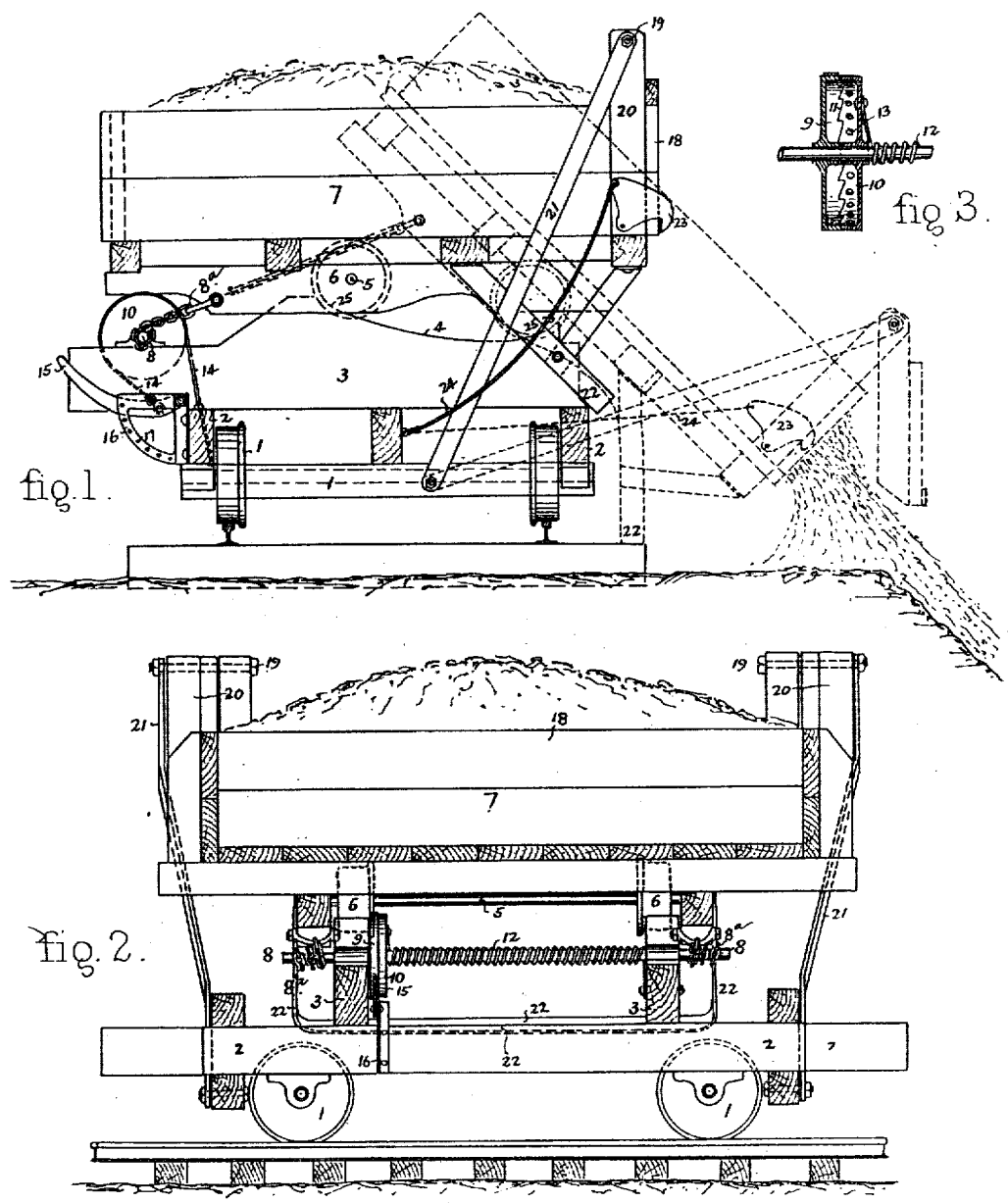

Patented October 11, 1904.

UNITED STATES PATENT OFFICE.

FRANK K. HOOVER AND ARTHUR J. MASON, OF KANSAS CITY, MISSOURI.

DUMP-CAR.

SPECIFICATION forming part of Letters Patent No. 772,041, dated October 11, 1904.

Application filed September 25, 1899. Serial No. 731,531. (No model.)

*To all whom it may concern:*

Be it known that we, FRANK K. HOOVER and ARTHUR J. MASON, both citizens of the United States, and residents of Kansas City, in the county of Jackson, in the State of Missouri, have invented certain new and useful Improvements in Dump-Cars, of which the following is a full, clear, and exact description, reference being had to the accompanying drawings, which form a part of this specification.

Our invention relates to improvements in dumping-cars of the class in which the car-body is pivotally mounted upon the car-truck and tilted or turned upon its pivot to discharge the load therefrom. In the ordinary construction of dump-cars of this class the pivotal point is fixed upon the truck-frame and the car-body simply turns upon this pivot, having no lateral movement whatever. In practice it is found that this construction is attended with a number of difficulties of a serious nature, the most prominent of which are, first, to prevent the frame of the car-truck interfering with the movement of the car-body as the dump is made the car-body must be elevated to such height above the truck as to present a very great disadvantage in loading the car, especially when loading with a steam-shovel, (the usual method,) in which case the additional height of the car-body shortens to that extent the first cut of the shovel, which becomes an important item in extensive operations; second, if the load is not to be dumped over an embankment, but on a comparative level with the car-track, the pivotal point of the car-body being fixed upon the truck, as the car-body is tilted to make the dump the dump side thereof is lowered and brought nearer to the car-track and the load falls in close proximity to the track, great quantities thereof rolling back and covering the track, requiring great labor in re-ering the track, requiring great labor in removing the same with shovels and delay in moving the cars; third, if the load is to be dumped over an embankment to make the dump successfully the track must be laid so close to the edge as in practice is found to be very difficult to maintain; otherwise the load falls upon the top of the embankment and piles upon the track, presenting the difficulty just above observed; fourth, if the load be not properly and evenly balanced over the pivotal point, but heavy on the side away from the dump, or the car-track on that side be low, great difficulty is experienced in tilting to make the dump, and in the latter case tilting the car-body will not be sufficient to make the dump, making it necessary to partially or wholly empty the car with shovels before it can be reloaded; fifth, if the car-track be low on the dumping side and the car-body is tilted to make the dump the shock of stopping the tilting of the car, being taken upon the truck, may overset the truck and car with disastrous results, and even if this does not happen great difficulty is experienced in restoring the car-body to position for reloading.

Among the leading objects of our invention is the successful overcoming of the difficulties hereinabove recited through the provision of a dump-car having its car-body raised but slightly above the truck and so mounted on the latter that the truck will not interfere with the tilting, whereby the load can be carried and thrown such a distance from the car-track as not to interfere with the moving of the car and from which the load can be thrown over an embankment while the car stands on the track and at such a distance from the edge of the embankment as to afford a substantial support for the car, in which the balancing of the load over the pivotal line of the car-body is immaterial, as also inequalities in height of the rails of the track, in which the dump may be made with equal facility however the load may be disposed in the car or whatever may be the inequalities of the track, in which the movement of the car-body, being under control throughout the tilting movement, is productive of less shock resulting from the sudden stop, in which such shock, being received by the track rather than by the truck, presents no element of danger in respect to the oversetting of the car, and in which the return of the car-body to loading position after dumping is automatic and without effort on the part of the operator.

To these and other ends our invention consists in certain features of novelty hereinafter described, and more particularly pointed out in the claims.

Referring to the drawings, Figure 1 represents an end elevation of a dump-car embodying our invention. Fig. 2 represents a side elevation of the same. Fig. 3 represents a detail view, partly in cross-section, of the brake-drum and tension-spring for controlling the tilting of the car-body and restoring same to position, and showing also the clutch mechanism of the drum for regulating the tension of the spring.

Similar numerals refer to similar parts throughout the several views.

1 represents a car-truck mounted and adapted to travel on the car-track in the usual manner. On the sills 2 of said truck are mounted the bolsters 3, each having an inclined upper face 4, forming an inclined track or way across the truck, the inclination being downwardly toward the side on which the dump is to be made. 5 represents an axle provided with wheels 6, arranged to travel upon said track or way formed by the bolsters. 7 represents a car-body pivotally mounted and supported upon said axle.

8 represents a shaft mounted upon the truck-frame, preferably upon the bolsters 3. $8^a$ represents a cable connected at one end to said shaft and at its other end to the car-body and adapted to be wound upon and slipped from said shaft.

9 represents a brake-drum fixedly mounted upon the shaft 8. 10 represents a tension-drum loosely mounted upon said shaft contiguous to said brake-drum. Said drums are each on their contiguous faces provided with teeth or serrations 11, thereby forming a clutch to secure their coöperation. 12 represents a coiled tension-spring surrounding said shaft 8, one end thereof being secured to the truck-frame and its other end connected to the tension-drum 10. Said spring is preferably to such extent compressed between said tension-drum and a fixed part of the truck-frame that the longitudinal expansion thereof against said drum will hold and retain the latter in operative relation with the brake-drum. In said tension-drum are provided holes 13 for the insertion of a bar to turn the drum to regulate the tension of the spring.

14 represents a strap-brake secured at one end upon the truck-frame, passing over the brake-drum, and secured at its other end to a brake-lever 15, mounted upon the truck-frame. A sector 16 is mounted upon the truck-frame and provided with holes 17 for the insertion of a pin to secure the brake-lever when the brake is set.

The side wall of the car-body on that side of the latter through which the dumping is to be effected is constituted by a door 18, which is suspended by hinges 19 upon the door-posts 20, as in the ordinary and well-known construction.

21 represents links pivotally connected at one end with the truck-frame and at the other end with the car-body, their function being to control the tilting and dumping of the car. Preferably, as shown in Fig. 1, the pivotal point of said links on the truck-frame is between the center and the dump side of the frame and the pivotal point of the car-body is near the top of the door-post, such construction securing better and more favorable control of the tilting and dumping. It is apparent, however, that said pivotal points may be otherwise disposed and the links will still perform their intended function.

22 represents a bumper mounted on the under side of the car-body and in such position and relation that when the car-body comes to its tilted position, as shown by dotted lines in Fig. 1, said bumper will descend and rest upon the ties, supporting the outer side of the car-body in its tilted position, and thereby the shock of the sudden stop of the tilting movement is taken by the ties instead of by the truck-frame, as in the usual construction.

23 represents a latch mounted upon the door-post and arranged to secure the door when closed, and a cord 24, connected to the latch-arm, is secured to a fixed part of the truck-frame at such point in relation to its length that as the car-body reaches the extremity of its tilt the latch will be raised and the door opened to permit the discharge of the load.

It will be evident that the incline of the bolsters forming the track or way 4 may be extended inwardly across the truck-frame to such an extent as may be found most desirable or efficient, the axle forming the pivot of the car-body being disposed on the latter in such relation thereto as to rest on the inner ends of the inclines when the car-body is in loading position. The preferable construction, however, is to locate the axle somewhat to one side of the longitudinal center line of the car-body away from the dump side, so that the major part of the load will normally be on that side of the pivotal line next the dumping side, and to correspondingly extend the inclined face of the bolsters so that when the car-body is in horizontal position and drawn back ready to load the wheels of the supporting-axle will ride at or near the top of the incline, ready to descend by gravity at the instant of release.

The car-body when ready to be or being loaded is held and retained in a substantially horizontal position upon its axis by the cable $8^a$ passing around the shaft 8, said shaft being locked by the application of the brake upon the brake-drum fixed thereon. When the load is to be dumped, on releasing the brake the weight of the load will cause the car-body to travel down the inclined track or way, drawing out the cable and turning the shaft against the tension of the spring 12. It is manifest that this advance movement of the car-body down the inclined track or way may be regulated and controlled by the application of the brake upon the brake-drum to check or accelerate such movement. During the early part of such movement, since the car-body is moving downwardly as well as laterally, the links 21 act to prevent the tilting of the car-body and to retain it for some distance, as it travels down the incline, in a substantially horizontal position. During the remainder and to the end of the tilting movement said links, while acting to tilt or turn the car-body upon its axis and bring it to the dumping position, as shown in dotted lines in Fig. 1, act also to prevent the too early or sudden tilting of the car-body and discharge of the load therefrom before the limit of the tilting movement is reached.

As the car-body arrives at the end of the tilting movement which may be prescribed for the discharge of the load the bumper 22 comes to rest upon the ties and the movement is arrested, the shock of the sudden stopping of the movement being taken by the ties and not transmitted to the truck-frame, as in the usual construction, and also at this point of the operation, the latch being just previously raised by the cord 24, the door opens and the load is cast from the car, for it will be observed that as the car-body with its load travels down the inclined track a considerable velocity will be acquired, giving to the car-body and its load a very considerable momentum, so that as the car-body is suddenly stopped and the door opened the load will by the momentum thus acquired shoot or be thrown from the car in much the same manner as a load is thrown from a shovel in the hands of a workman. This constitutes one of the leading features of our invention, and thereby is obtained a most important and material advantage over the usual and ordinary construction in that the load will be entirely moved and thrown from the car, a part not being left therein requiring to be shoveled out by hand, and the load is carried and discharged at such a distance laterally of the car that it may be thrown over an embankment at such distance from the track that it does not tend to roll back upon and obstruct the latter, whereby the track may be maintained in operative condition with increased safety and decreased labor. The dump being made and the load discharged, the action of the tension-spring at once restores the car-body to position ready for reloading. This automatic restoration of the car-body to position also constitutes a very material advantage in saving of time and labor which are required when the car-body is restored in the usual manner. It will be obvious that as the loaded car-body descends, traveling down the track 4, the force of the descent will be increasingly retarded and the shock of the sudden stop in a measure ···d by the action of the tension-spring. The latter thus constitutes a storage-receptacle for the force of the descent represented by the gravity and momentum of the loaded car, which force is later given out and expended by the spring in restoring the empty car to receiving position. The track 4 may be turned up at the ends, as shown at 25, to limit the travel of the car-body.

Having fully described our improvements, what we claim as our invention, and desire to secure by Letters Patent, is—

1. In a tilting dump-car, the combination with a truck and an inclined track or way mounted thereon, of a car-body, and a single pair of wheels journaled on opposite sides of said car-body respectively and in the same vertical plane transversely of the track, said wheels being mounted and arranged to travel on said track or way and forming a moving pivot on which the car-body may tilt, substantially as set forth.

2. In a tilting dump-car, the combination with a truck and an inclined track or way mounted thereon, of a car-body, and a single pair of wheels journaled on opposite sides of said car-body respectively and in a vertical plane which is to one side of the central vertical plane of the car-body, said wheels being mounted and arranged to travel on said track or way and forming a moving pivot on which the car-body may tilt, substantially as set forth.

3. In a tilting dump-car, the combination with a truck, and an inclined track or way mounted thereon, of an axle provided with suitable wheels, mounted upon and arranged to travel on said track or way, and forming a moving pivot to the car-body, and a car-body pivotally mounted upon said axle, substantially as set forth.

4. In a tilting dump-car, the combination with a truck-frame and a car-body pivotally mounted on said frame, and having a lateral movement thereon, of a bumper mounted upon the car-body, arranged to strike and rest upon the ties, as the end of the tilt is reached, substantially as set forth.

5. In a tilting dump-car, the combination with a truck-frame, an inclined track or way mounted upon said frame and a car-body pivotally mounted on said track or way, and having a lateral movement thereon, of links pivotally connected with said frame, and with the car-body controlling the tilt of the car-body; substantially as set forth.

6. In a tilting dump-car, the combination with a truck-frame and an inclined track or way mounted upon said frame, of a car-body pivotally mounted to travel on said track or way, and means connected with said truck-frame and car-body serving to store the force of momentum of the latter acquired during its discharging movement and to later exper : said force in restoring the car-body to receiving position, substantially as set forth.

7. In a tilting dump-car, the combination with a truck-frame and an inclined track or way mounted upon said frame, of a car-body pivotally mounted to travel over said track or way, means for effecting the tilting of the car-body during the latter part of its discharging movement, and a spring interposed between the truck-frame and car-body and by its tension serving to retard the discharging movement of the car-body and subsequently effect its return to normal receiving position, substantially as set forth.

8. In a tilting dump-car, the combination with a truck-frame, an inclined track or way mounted upon said frame, and a car-body, pivotally mounted on said track or way and arranged to travel laterally between, of a shaft mounted on said truck-frame, cables connected with said shaft, and with the car-body, and means for operating the shaft to restore the car-body to position when tilted; substantially as set forth.

9. In a tilting dump-car, the combination with a truck-frame, and a car-body pivotally mounted on said frame, of a shaft mounted on said truck-frame, cables connected with said shaft and with the car-body, a brake-drum fixedly mounted on said shaft, and a brake connected with said truck-frame, and provided with a suitable brake-lever, and arranged to engage said brake-drum to control the tilting movement of said car-body, substantially as set forth.

10. In a tilting dump-car, the combination with a suitable truck-frame, and a car-body pivotally mounted thereon, of a shaft mounted on the truck-frame, cables connected with said shaft and with the car-body, and a tension-spring having one end fixedly connected to the truck-frame and its other end connected with said shaft for restoring automatically said car-body to loading position when tilted, substantially as set forth.

11. In a tilting dump-car, the combination with a truck-frame and a car-body pivotally mounted on said frame, of means connected with said truck-frame and car-body serving to store the force of momentum of the latter acquired during its discharging movement and to later expend said force in restoring the car-body to receiving position, substantially as set forth.

12. In a tilting dump-car, the combination with a truck-frame, and a car-body pivotally mounted on said frame and adapted to move laterally thereof, of a tension-spring mounted between said truck-frame and the car-body and serving to fully return the car-body to normal position after its tilting and dumping movement, substantially as set forth.

13. In a tilting dump-car, the combination with a truck-frame, and a car-body, pivotally mounted on said frame, of a shaft mounted upon the truck-frame, cables connected with said shaft, and with the car-body, a brake-drum fixedly mounted on said shaft, a tension-drum loosely mounted on said shaft, and having a clutch connection with said brake-drum, a tension-spring having a fixed end, and its other end connected to said tension-drum, for restoring the car-body to position, after being tilted, and a brake connected with the truck and arranged to be applied to the brake-drum to control the tilting movement of the car-body; substantially as set forth.

14. In a tilting dump-car, the combination with a truck-frame and a car-body mounted to have a combined sliding and tilting movement thereon, of a shaft mounted on the truck-frame, winding connections from said shaft to the car-body, a drum fixedly mounted on said shaft, a clutch loosely mounted on said shaft and arranged to engage said drum, and a tension-spring having one end fixed to the truck-frame and the other connected with said clutch, substantially as set forth.

15. In a tilting dump-car, the combination with a truck, and an inclined track or way mounted thereon, of a pivotally-mounted car-body arranged to travel on said track or way, and a bumper mounted upon the car-body, and arranged to strike and rest upon the ties as the end of the tilt is reached, substantially as set forth.

16. In a tilting dump-car, the combination with a truck, and an inclined track or way mounted thereon, of a pivotally-mounted car-body arranged to travel on said track or way, links pivotally connected with the truck-frame, and with the car-body for controlling the tilt and dump, and a bumper mounted upon the car-body and arranged to strike and rest upon the ties as the end of the tilt is reached, substantially as set forth.

17. In a tilting dump-car, the combination with a truck, and an inclined track or way mounted thereon; of a pivotally-mounted car-body arranged to travel on said track or way, a shaft mounted on the frame of said truck, cables connected with said shaft and with the car-body, a brake-drum fixedly mounted on said shaft, and a brake mounted upon the truck-frame and arranged to be applied to said brake-drum to control the descent of the car-body, substantially as set forth.

18. In a tilting dump-car, the combination with a truck, and an inclined track or way mounted thereon; of a pivotally-mounted car-body arranged to travel on said track or way, a shaft mounted on the frame of said truck, cables connected with said shaft and with the car-body, a brake-drum fixedly mounted on said shaft, a brake mounted on the truck-frame and arranged to be applied to said brake-drum to control the descent of the car-body, and links pivotally connected with the truck-frame, and with the car-body to control the tilt and dump, substantially as set forth.

19. In a tilting dump-car, the combinwith a truck, and an inclined track or way mounted thereon, of a pivotally-mounted car-body arranged to travel on said track or way, a shaft mounted on the frame of said truck, cables connected with said shaft and with the car-body, and a tension-spring fixedly connected at one end to the truck-frame, and at its other end connected with said shaft for restoring the car-body to position after the dump is made, substantially as set forth.

20. In a tilting dump-car, the combination with a truck and an inclined track or way mounted thereon, of a pivotally-mounted car-body arranged to travel on said track or way, links pivotally connected with said truck and with the car-body, for controlling the tilt and dump, a shaft mounted on the frame of said truck, cables connected with said shaft, and with the car-body, and a tension-spring fixedly connected at one end with the truck-frame, and at its other end connected with said shaft for restoring the car-body to loading position after the dump has been made, substantially as set forth.

FRANK K. HOOVER.
ARTHUR J. MASON.

Witnesses:
J. W. HOOVER,
C. E. KOONS.